(12) United States Patent
Leeuwangh

(10) Patent No.: US 9,243,763 B2
(45) Date of Patent: Jan. 26, 2016

(54) BEACON LIGHT OPTIC, BEACON LIGHT, METHOD FOR OBTAINING A BEACON LIGHT OPTIC

(71) Applicant: Orga Holding B.V., Schiedam (NL)

(72) Inventor: Thomas Leeuwangh, Schiedam (NL)

(73) Assignee: Orga Holding B.V., Schiedam (NL)

( * ) Notice: Subject to any disclaimer, the term of this patent is extended or adjusted under 35 U.S.C. 154(b) by 0 days.

(21) Appl. No.: 14/372,568

(22) PCT Filed: Jan. 18, 2013

(86) PCT No.: PCT/NL2013/050025
§ 371 (c)(1),
(2) Date: Jul. 16, 2014

(87) PCT Pub. No.: WO2013/109146
PCT Pub. Date: Jul. 25, 2013

(65) Prior Publication Data
US 2014/0362571 A1  Dec. 11, 2014

(30) Foreign Application Priority Data
Jan. 20, 2012  (NL) .................................... 2008163

(51) Int. Cl.
| | |
|---|---|
| F21V 7/00 | (2006.01) |
| F21S 8/00 | (2006.01) |
| F21V 5/04 | (2006.01) |
| F21K 99/00 | (2010.01) |
| F21V 7/09 | (2006.01) |
| G02B 19/00 | (2006.01) |
| F21W 111/00 | (2006.01) |
| F21W 111/047 | (2006.01) |
| F21Y 101/02 | (2006.01) |
| F21W 111/043 | (2006.01) |

(52) U.S. Cl.
CPC . F21S 8/003 (2013.01); F21K 9/50 (2013.01); F21V 5/04 (2013.01); F21V 7/0008 (2013.01); F21V 7/0091 (2013.01); F21V 7/09 (2013.01); G02B 19/0061 (2013.01);
(Continued)

(58) Field of Classification Search
CPC ........ B60Q 1/2611; F21S 8/003; F21S 10/06; F21S 48/1329; F21S 48/215; F21S 48/236; F21V 5/02; F21V 5/04; F21V 5/08; F21V 7/0091; F21V 7/09; F21V 13/04; F21W 2111/00; F21W 2111/043; F21W 2111/06; G02B 19/0028; G02B 19/0061
USPC .................. 362/237, 308, 309, 326, 327, 329
See application file for complete search history.

(56) References Cited

U.S. PATENT DOCUMENTS

| | | | |
|---|---|---|---|
| 2005/0135109 A1 | 6/2005 | Stout | |
| 2005/0146884 A1* | 7/2005 | Scheithauer | ......... B60Q 1/2611 362/470 |

(Continued)

FOREIGN PATENT DOCUMENTS

| | | |
|---|---|---|
| DE | 102005061815 | 6/2007 |
| EP | 1741975 | 1/2007 |
| EP | 2141407 | 1/2010 |

(Continued)

*Primary Examiner* — Hargobind S Sawhney
(74) *Attorney, Agent, or Firm* — Petterson Intellectual Property Law, P.C.; James R. Cartiglia; Timothy L. Capria

(57) ABSTRACT

A beacon light optic, comprising a reflective surface having an optical axis wherein the reflective surface is composed of surface parts of at least two at least partly overlapping at least segments of rotation symmetrical surfaces, an entrance area comprising an entrance surface for allowing light to enter the beacon light optic, an exit area through which light exits the beacon light optic, a light emitting element disposed in front of the entrance surface such that light emitting from the light emitting element enters the beacon light optic through the entrance area.

13 Claims, 6 Drawing Sheets

(52) U.S. Cl.
CPC ..... *F21W 2111/00* (2013.01); *F21W 2111/043* (2013.01); *F21W 2111/047* (2013.01); *F21Y 2101/02* (2013.01)

(56) References Cited

U.S. PATENT DOCUMENTS

2010/0091507 A1* 4/2010 Li .............................. F21V 7/09
362/470

2010/0097809 A1* 4/2010 Munro ...................... F21V 5/04
362/308

FOREIGN PATENT DOCUMENTS

| | | | |
|---|---|---|---|
| FI | WO 2004070266 A1 * | 8/2004 | ................ B64F 1/18 |
| GB | 2350176 | 11/2000 | |
| IT | EP 1334870 A2 * | 8/2003 | ........... B60Q 1/2611 |
| WO | 2009110011 | 9/2009 | |
| WO | 2009141762 | 11/2009 | |
| WO | 2011091259 | 7/2011 | |

* cited by examiner

BEACON LIGHT OPTIC, BEACON LIGHT, METHOD FOR OBTAINING A BEACON LIGHT OPTIC

TECHNICAL FIELD

The present disclosure relates to a beacon light used to mark obstructions for naval and/or aviation navigation. In particular obstructions that may present a hazard to, for example, aircraft or marine vessel navigation are marked, preferably according to the rules and regulations applicable for the respective purpose.

BACKGROUND

Beacon lights are known and one of the typical requirements is to transmit a bundle of light over a relatively wide angle, typically 360 degrees, in a horizontal plane over a relatively small vertical angle, i.e. with a limited beam spread, to provide an obstruction warning in all directions. The definition of beam spread depends on the regulations to be applied. A common rule is to consider the beam spread at full width half maximum (FWHM). The beam spread is then considered to be the angle of the full width of the beam at half the maximum of the peak intensity. Typically the beam spread is the angle of the beam measured in a vertical plane over which the intensity of the emitted light is greater than e.g. 50%—depending on the regulations this may be 10%—of the peak intensity of the emitted light. The beam spread may typically be on the order of several degrees, e.g. 5 degrees or 2.5 degrees. For certain applications such as offshore obstruction lights or aviation obstruction lights, the desired pattern of emitted light is defined by rules and/or regulations.

A typical beacon light comprises a plurality of beacon light optics arranged in juxtaposition such that the optical axes of the beacon light optics are angled relative to each other and the exit areas of the beacon light optics face outwards. The beacon light optic usually is of a rotation symmetrical type, e.g. a paraboloid and may be a massive optic or an air-filled optic. A massive optic can be a massive plastic optic or a massive glass optic. Each optic typically comprises a single light emitting element, preferably an LED-element.

A drawback of the known beacon light is that a lot of optics are needed to form a beacon light with a 360 degrees angular distribution. Since an individual beacon light optic is relatively expensive, and relatively heavy, the beacon light may become relatively large, expensive and/or difficult to install.

Therefore, there is a need for a beacon light that can be more cost effective and/or more compact.

Furthermore, each light emitting element consumes energy, and, in particular for systems operating on batteries in case of emergency, energy consumption of the beacon light is preferably as low as possible, because less energy consumption also means a smaller battery pack. Since the batteries used for these emergency purposes are relatively expensive, there is a wish to minimize the battery pack required.

Thereto, an embodiment provides a beacon light optic according to claim 1.

BRIEF SUMMARY

By providing a beacon light optic of which the reflective surface is a composed reflective surface, light of the light emitting element can be directed in a predetermined light beam configuration. During the design of the beacon light optic, at least segments of two rotation symmetrical surfaces can be laid partly over each other such that the segments of the rotation symmetrical surfaces at least partly overlap. The reflective surface of the beacon light optic is then formed by the surface parts of the at least partly overlapping rotation symmetrical surfaces that form the outer surface. That way a composed reflective surface is created of the beacon light optic. The thus created composed reflective surface can then be manufactured in an optic.

The composed reflective surface can be created by using at least two complete rotation symmetrical surfaces, but can also be created by using at least two segments of rotational symmetrical surfaces, or a combination of at least a complete rotation symmetrical surface and at least a segment of a rotation symmetrical surface. Preferably, a segment of a rotation symmetrical surface is a wedge like segment such that over the height of the reflective surface an intersection between overlapping at least segments of rotation symmetrical surfaces can be obtained. Anywhere in this text where rotation symmetrical surface is used, also a segment of a rotation symmetrical surface can be understood and vice versa.

Since the beacon light optic is composed of at least two partially overlapping rotation symmetrical surfaces, there is an intersection between two overlapping rotation symmetrical surfaces. Such an intersection may create a relatively sharp transition between the original rotation symmetrical surfaces however, the intersection may also be smoothened to a certain extent.

According to an embodiment, a first rotation symmetrical surface is taken and at least a second rotation symmetrical surface is positioned with respect to the first rotation symmetrical surface such that the two rotation symmetrical surfaces at least partially overlap. The beacon light optic is thus composed of two at least partially overlapping rotation symmetrical surfaces. The reflective outer surface of such a composed beacon light optic is then formed by the outer surface parts of the rotation symmetrical surfaces. Such a composed optic inevidently is provided with intersection lines between the original rotation symmetrical surfaces, although such intersection lines may be smoothened. This is contrary to a beacon light optic which is ovalized at the exit area. Such a beacon light optic can be obtained by rotating a rotation symmetrical surface around a certain point, e.g. the focal point, in a single plane. The external surface, or the outer reflective surface, can then e.g. be an ovalized surface of which the entrance area can be circular and the entrance area can be an ellipse. Such a reflective surface may be smooth, but does not sufficiently provide for a relatively narrow vertical light beam and a relatively wide horizontal light beam.

The rotation symmetrical surfaces can be considered as basis forms and do not necessarily have to be the same. Depending on the desired light pattern, the rotation symmetrical surfaces can be similar or not.

The composed beacon light optic according to an embodiment generates a combined light pattern with a relatively narrow vertical beam spread and a relatively wide horizontal beam spread. The light pattern is composed of the light patterns of parts of the original individual rotation symmetrical surfaces.

Preferably, the optical axes of the at least two rotation symmetrical surfaces are under an angle with respect to each other in a plane comprising the optical axes of each rotation symmetrical surface. The two-dimensional plane formed by the optical axes of the rotation symmetrical surfaces can be seen as the plane in which the rotation symmetrical surface can be pivoted or angled or translated to create a composed reflective surface for the beacon light optic. By manipulating the rotation symmetrical surface in a two-dimensional plane a light beam with a relatively large horizontal beam spread and a relatively small vertical beam spread may be obtained. Such a composed light beam gives a combined light pattern that can be advantageous for a beacon light optic that may be used in a beacon light to obtain a large angular light distribution, e.g. 360 degrees. By providing an optic with a relatively large horizontal beam spread and relatively small vertical beam spread less optics may be required to obtain the required angular distribution, while in addition, the vertical beam spread remains within the regulation requirements. When less beacon light optics may be sufficient, also fewer light emitting elements may be needed. Fewer light emitting elements also means a smaller battery pack required for beacon lights which need to operate on battery power in case of emergency.

So, a more compact and/or more cost effective beacon light may be obtained. In addition, a more compact beacon light having fewer beacon light optics may be easier to handle and/or to install, in particular at locations which may be difficult to reach, such as offshore locations or high altitude locations.

According to an embodiment of the present disclosure, the rotation symmetrical surfaces have the same focal distance. This may be advantageous to create an evenly distributed beam in horizontal direction, as well as an evenly distributed beam in vertical direction. Whereas varying focal distances may create a specific, e.g. non-even, beam pattern. In addition, the focal point may serve as the point around which the rotation symmetrical surfaces may be positioned, the focal point may thus serve as a so-called pivotal point.

Advantageously, the rotation symmetrical surfaces are paraboloid surface, such that the reflective surface of the beacon light optic is composed of parts of the paraboloid surfaces. A paraboloid surface is known to create a light beam with a relative narrow beam spread. By composing the reflective surface of at least two paraboloid surfaces, the beam spread can remain narrow in one direction, while the beam spread may become larger in another direction. When the optical axes of the paraboloid surfaces are under an angle in the plane formed by the optical axes, the beam spread can remain relatively narrow in a direction perpendicular to the plane and can become wider in a direction of the plane perpendicular to the optical axis of the composed reflective surface.

In an embodiment, the beacon light optic is a massive optic such that a higher efficiency can be obtained than with an optic filled with air. The massive optic is preferably made from plastic, but can also be made from glass. As a plastic material polymethylmethacrylate (PMMA) or polycarbonate (PC) may be used. In a massive optic, the reflective surface can be a total internal reflection (TIR) surface.

An embodiment further relates to a beacon light for marking obstructions for marine and/or aviation navigation comprising a plurality of beacon light optics. The plurality of beacon light optics are arranged in juxtaposition such that the optical axes of the beacon light optics are under an angle relative to each other and the exit areas of the beacon light optics face outwards. Thus, a beacon light can be obtained with an angular distribution which can be up to 360 degrees to provide for an all direction obstacle warning light.

In one embodiment, the optics of said plurality of beacon light optics are arranged such that light can be emitted outwardly over at least 90 degrees angular distribution in a plane defined by the optical axes of the rotation symmetrical surfaces. Beacon lights with a 90 degrees angular distribution in the horizontal plane are particularly useful for marking obstructions that include walls defining inward and outward corners. A straight inward corner may, for example, be fitted with a beacon light with an angular distribution of approximately 90 degrees, while a straight wall may be fitted with a beacon light with an angular distribution of approximately 180 degrees, and a straight outward corner may be fitted with a beacon light with an angular distribution of about 270 degrees.

In another embodiment, the beacon light may include a further plurality of beacon light optics, similarly arranged as the plurality of beacon light optics and stacked above them. So, a beacon light optic with multiple rows of beacon light optics may be obtained to increase the emitted light intensity.

Further embodiments are represented in the subclaims.

The invention will further be elucidated on the basis of exemplary embodiments which are represented in the drawings. The exemplary embodiments are given by way of non-limitative illustration of the invention.

BRIEF DESCRIPTION OF THE DRAWINGS

It is noted that the figures are only schematic representations of embodiments of the invention that are given by way of non-limited example. In the figures, the same or corresponding parts are designated with the same reference numerals.

DETAILED DESCRIPTION

Figure 1:
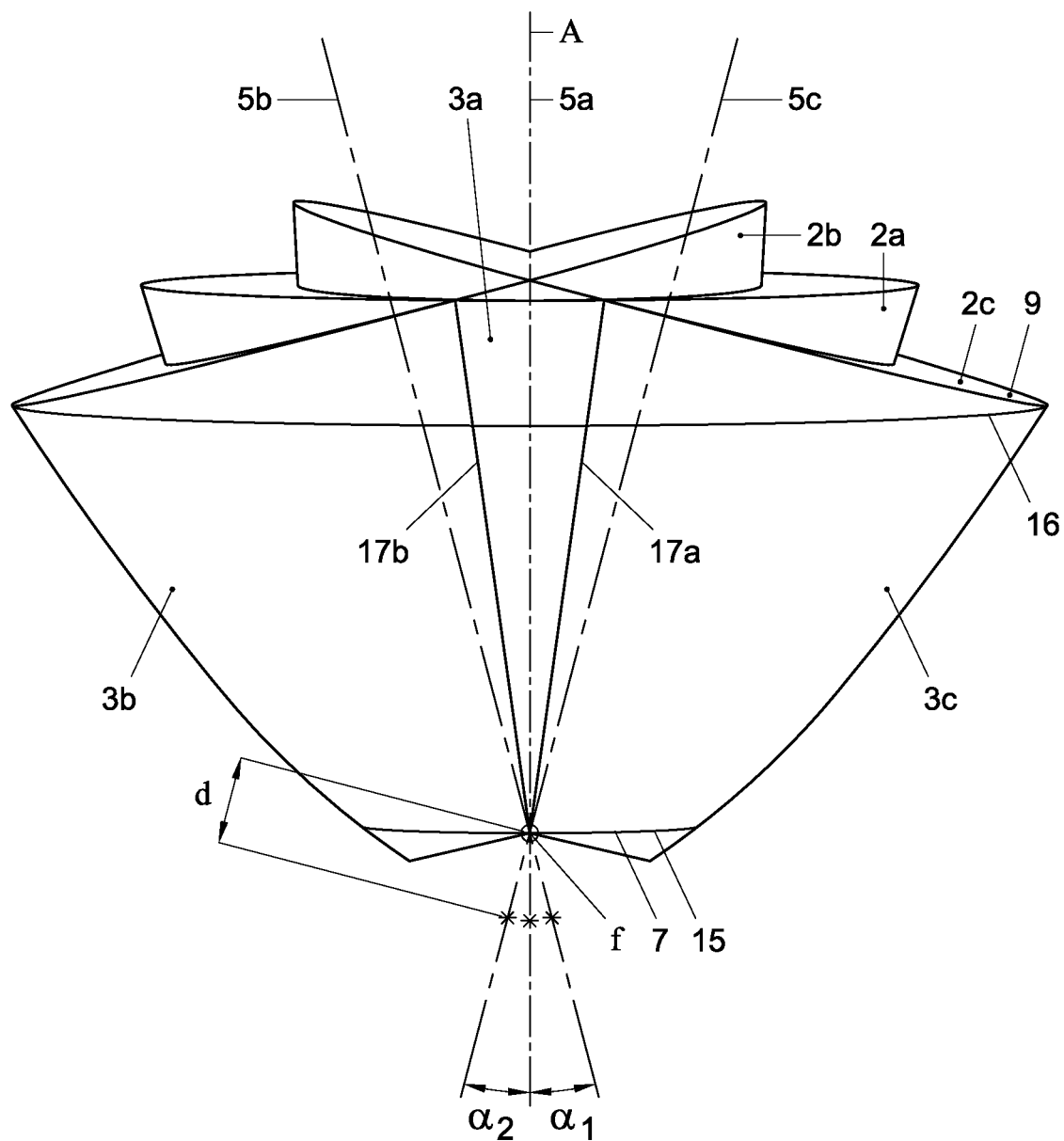
FIG. 1 shows a schematic perspective view of a method for obtaining a beacon light optic according to the present disclosure using complete rotation symmetrical surfaces.

FIG. 1 schematically illustrates a method for obtaining a beacon light optic 1 according to the present disclosure. To obtain a beacon light optic 1, one may start with a rotation symmetrical surface 2. The rotation symmetrical surface 2 is typically a paraboloid surface. A paraboloid surface is well known for its characteristics of focusing a light beam in all directions, i.e. in vertical as well as in horizontal direction. A paraboloid surface may create a relatively narrow light beam having a relatively small divergence in both horizontal and vertical directions. A paraboloid surface may therefore be a relatively efficient optic to create a light beam with a limited vertical beam spread.

To create a beacon light optic 1, the rotation symmetrical surface 2 may be duplicated. This procedure is preferably done virtually, e.g. in a graphics program. The outer surface parts 3 may form the reflective surface 4 of the beacon light optic 1. The rotation symmetrical surface 2 can be considered as the basis form that can be used to compose the beacon light optic 1.

In the embodiment shown in FIG. 1, there are three rotation symmetrical surfaces 2a, 2b and 2c shown. However, a beacon light optic 1 may also be obtained by using two or three or more rotation symmetrical surfaces 2. In this example, the rotation symmetrical surfaces 2a, 2b, 2c are identical surfaces. However, three different rotation symmetrical surfaces 2a, 2b, 2c can also be used to form the composed outer reflective surface 4 of the beacon light optic 1.

Figure 2:
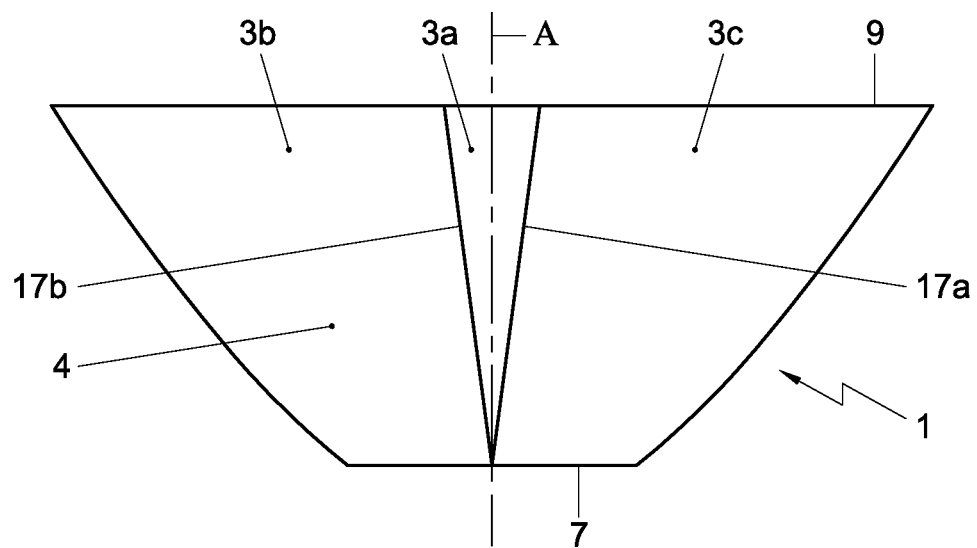
FIG. 2 shows a schematic front view of a beacon light optic according to the present disclosure as obtained by the method of FIG. 1.
Figure 3:
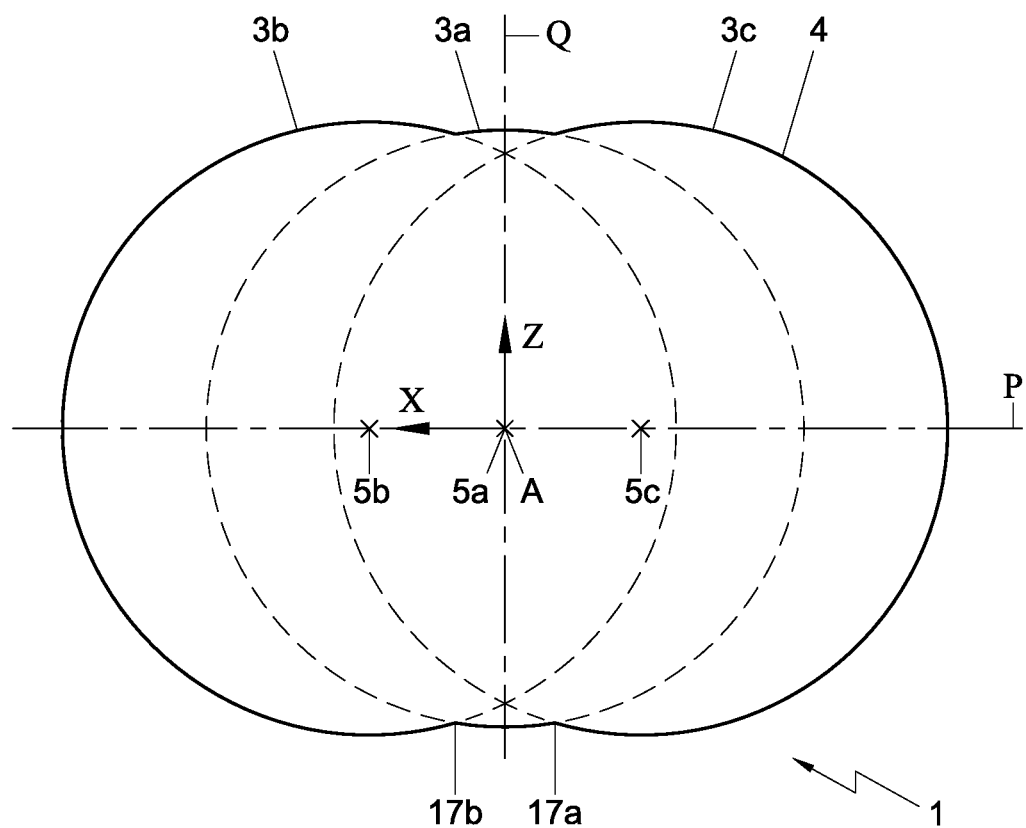
FIG. 3 shows a schematic top view of a beacon light of FIG. 2.

The rotation symmetrical surface 2a having optical axis 5a may be positioned, in FIG. 1, to the left to form rotation symmetrical surface 2b having optical axis 5b, and to the right, in FIG. 1, to form rotation symmetrical surface 2c having optical axis 5c. Each rotation symmetrical surface 2a, 2b, 2c has outer surface parts 3a, 3b, 3c. The outer surface parts 3a, 3b, 3c are the surface parts that form the outer surface 6 of the beacon light optic 1, wherein the outer surface 6 forms the reflective surface 4. The thus created reflective surface 4 is represented in front view in FIG. 2 and in top view in FIG. 3. The reflective surface 4 is composed of the outer surface parts 3a, 3b and 3c from the rotation symmetrical surfaces 2a, 2b and 2c. The reflective surface 4 has its own optical axis A. As can be seen in FIG. 2 and FIG. 3, the in FIG. 1 created outer reflective surface 4 is then cut off along the lines 15 and 16 to create an entrance area 7 and an exit area 9 respectively. Cutting off the composed optic of FIG. 1 is mainly done for manufacturing purposes and/or installation purposes.

In the embodiment shown in FIGS. 1-3 have the rotation symmetrical surfaces 2b and 2c an angle $\alpha 1$, $\alpha 2$ with respect to rotation symmetrical surface 2a as basis form in a plane P comprising the optical axes 5a, 5b, 5c of each rotation symmetrical surface 2a, 2b, 2c. The rotation symmetrical surface 2b has an angle $\alpha 1$ with respect to the rotation symmetrical surface 2a, and the rotation symmetrical surface 2c has an angle $\alpha 2$ with respect to the rotation symmetrical surface 2a. The rotation symmetrical surfaces 2b, 2c are positioned with respect to the rotation symmetrical surface 2a as basis form over angles $\alpha 1$ and $\alpha 2$ respectively. The angles $\alpha 1$ and $\alpha 2$ may be the same, but can be different as well. In this embodiment, the angles $\alpha 1$ and $\alpha 2$ are the same, such that a symmetrical optic 1 is obtained with respect to a plane Q perpendicular to the plane P.

The thus composed beacon light optic 1 can maintain the relatively small divergence of the light beam in one direction, here vertical direction z, and a relatively wide divergence of the light beam in another direction, here horizontal direction x. Directions x and z are in this embodiment perpendicular to each other, but, depending on the way the rotation symmetrical surfaces 2 are positioned with respect to each other, this may be different, which may result in an optic with different characteristics.

The outer surfaces 2a, 2c and 2a, 2b intersect each other at intersections 17a and 17b respectively. The intersections 17a, 17b can be relatively sharp transitions between the subsequent overlapping outer surface parts 3a, 3c and 3a, 3b respectively, but the transitions can also be smoothened. The intersections 17a, 17b are line intersections and can be straight or curved.

In the embodiment shown in FIGS. 1-3, the rotation symmetrical surfaces 2a, 2b and 2c each have the same focal distance d and the same focal point f to obtain a more optimal light beam when a single light emitting element is used. The focal point f is in this embodiment the point over which the rotation symmetrical surfaces are angled, but it can be a different point as well. When using rotational symmetrical surfaces 2 with the same focal distance d and the focal point f on the same location, and in addition, to position them under the same angles $\alpha 1$ and $\alpha 2$, a reflective surface 4 is obtained that is symmetrical with respect to axis x and with respect to axis z. The reflective surface 4 optimally creates a light beam with a small divergence in the z-direction and a relatively wide divergence in the x-direction.

Figure 4:
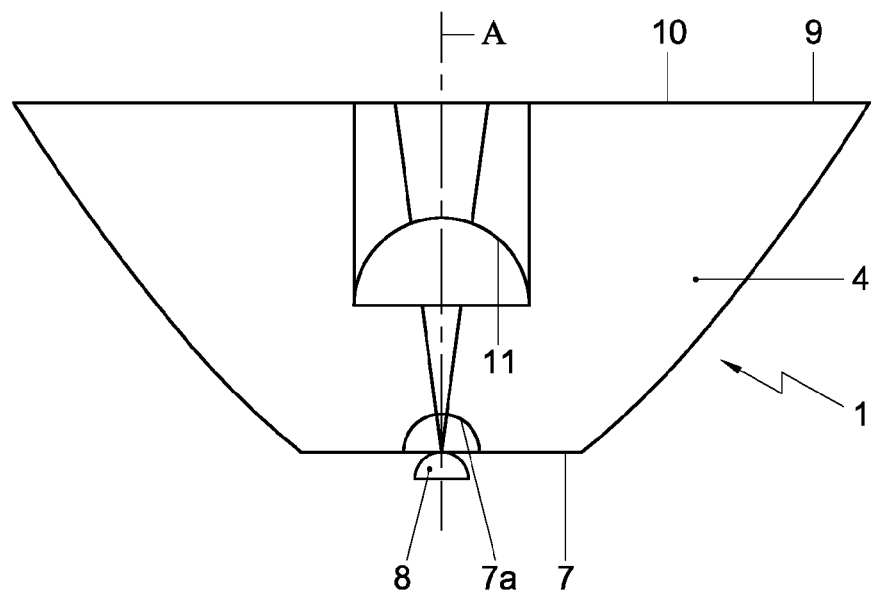
FIG. 4 shows a schematic front view of a beacon light optic according to the present disclosure with additional lens surfaces.

The optic 1 has an entrance area 7 allowing light emitted from a light emitting element 8 to enter the optic 1. The entrance area 7 comprises here, as shown in FIG. 4, a first lens surface 7a that directs the light emitted towards the reflective surface 4. The first lens surface 7a is here spherically, but can have various forms, such as asymmetrical or angular.

The light emitting element 8 is preferably a light emitting diode (LED). In a preferred embodiment, there is a single LED 8 per optic 1. The light emitting element 8 may be a composed light emitting element comprising multiple light emitting sources such as light emitting diodes. The light emitting element 8 may comprise a configuration of e.g. LEDs, the LEDs may be configured in a row, or a square or in a circular arrangement. Also, LEDs in different colours may be provided. Preferably, the light emitting element 8 is positioned in the focal point f of the optic 1. However, the position of the light emitting element 8 with respect to the focal point f, in particular of a composed light emitting element 8 can be a variable to steer the outputted light beam.

Further, the optic 1 has an exit area 9 through which the light rays from the light emitting element 8 exit the optic 1. In case the optic 1 is a massive optic 1, i.e. the optic 1 is filled with material, such as a transparent plastic material, the exit area 9 comprises an exit surface 10. The exit surface 10 may be a flat surface, or may be curved, depending on whether further control of the outputted light beam in horizontal or vertical direction is required.

A massive optic 1 is advantageous with respect to an air filled optic 1 because with a massive optic 1 the return produced can be higher. The outer reflective surface 4 then is a total internal reflection surface 4. A massive optic can be injection moulded, or manufactured using abrasive techniques. Alternatively, for an air-filled optic, the reflective surface 4 can be provided with a reflective coating that may be applied to a back surface of the optic 1. The back surface can be considered as an outer surface of the optic 1 facing away from the optical axis A, and as opposed to an inner surface of the optic 1 facing towards the optical axis A of the optic 1. In a massive optic 1, the first lens surface 7a can be obtained by providing a cavity in the massive optic 1.

To provide for additional efficiency of the optic 1, a second lens surface 11 through which part of the light rays may further be directed. Also, when such a second lens surface 11 is provided, a massive optic 1 is advantageous with respect to an air-filled optic 1, because in a massive optic 1, there are less changes of medium. Also, in a massive optic 1, more surfaces may be provided to direct the light rays.

Figure 5:
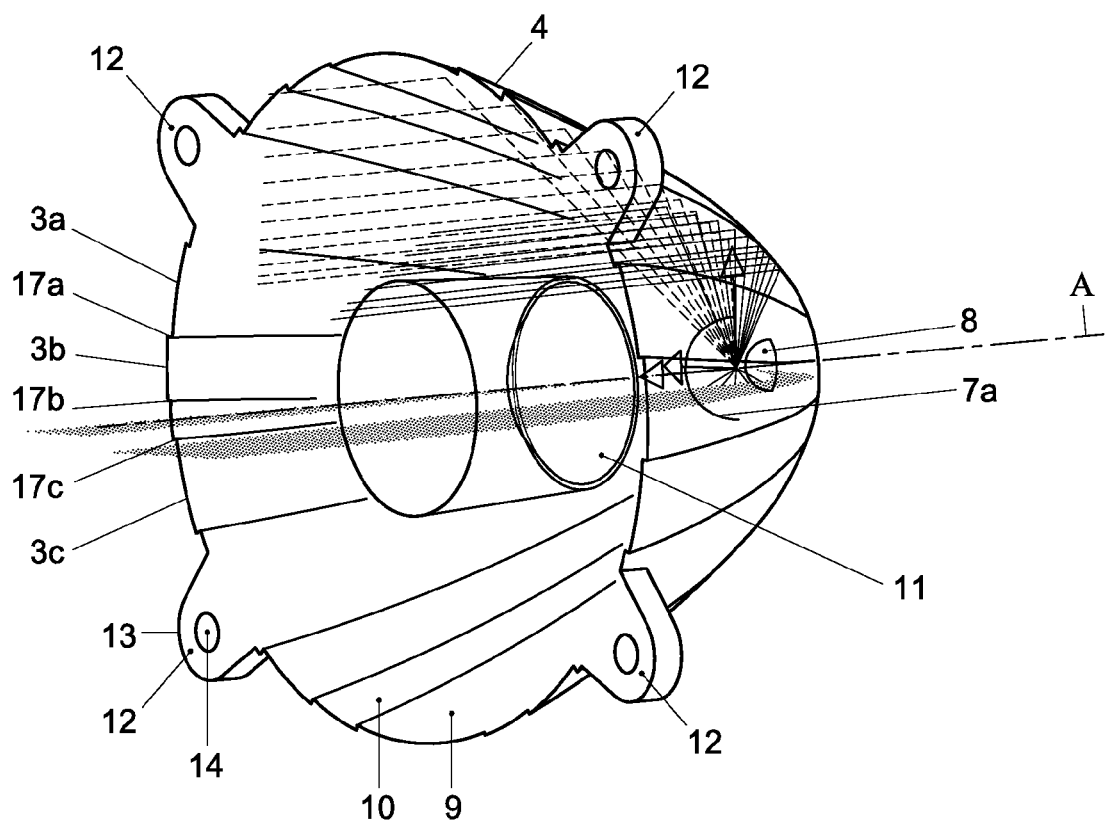
FIG. 5 shows a schematic perspective view of a beacon light optic of FIG. 4 illustrating the paths of light rays emanating from the light emitting element.

FIG. 5 shows in a perspective view the path the light rays emitted from the light emitting element 8 follow through the optic 1. The light emitting element 8, schematically shown in FIG. 5, is preferably an LED and can be a single LED or a configuration of LEDs. The light emitting element 8 emits rays of light in various directions. Typically, an LED emits light over an angle of approximately 180 degrees. The emitted rays of light enter the entrance surface 7. The entrance surface 7 comprises a first lens surface 7a that controls the light rays in horizontal and in vertical direction, i.e. here in the x-direction and the z-direction. The first lens surface 7a can have various forms.

Figure 6:
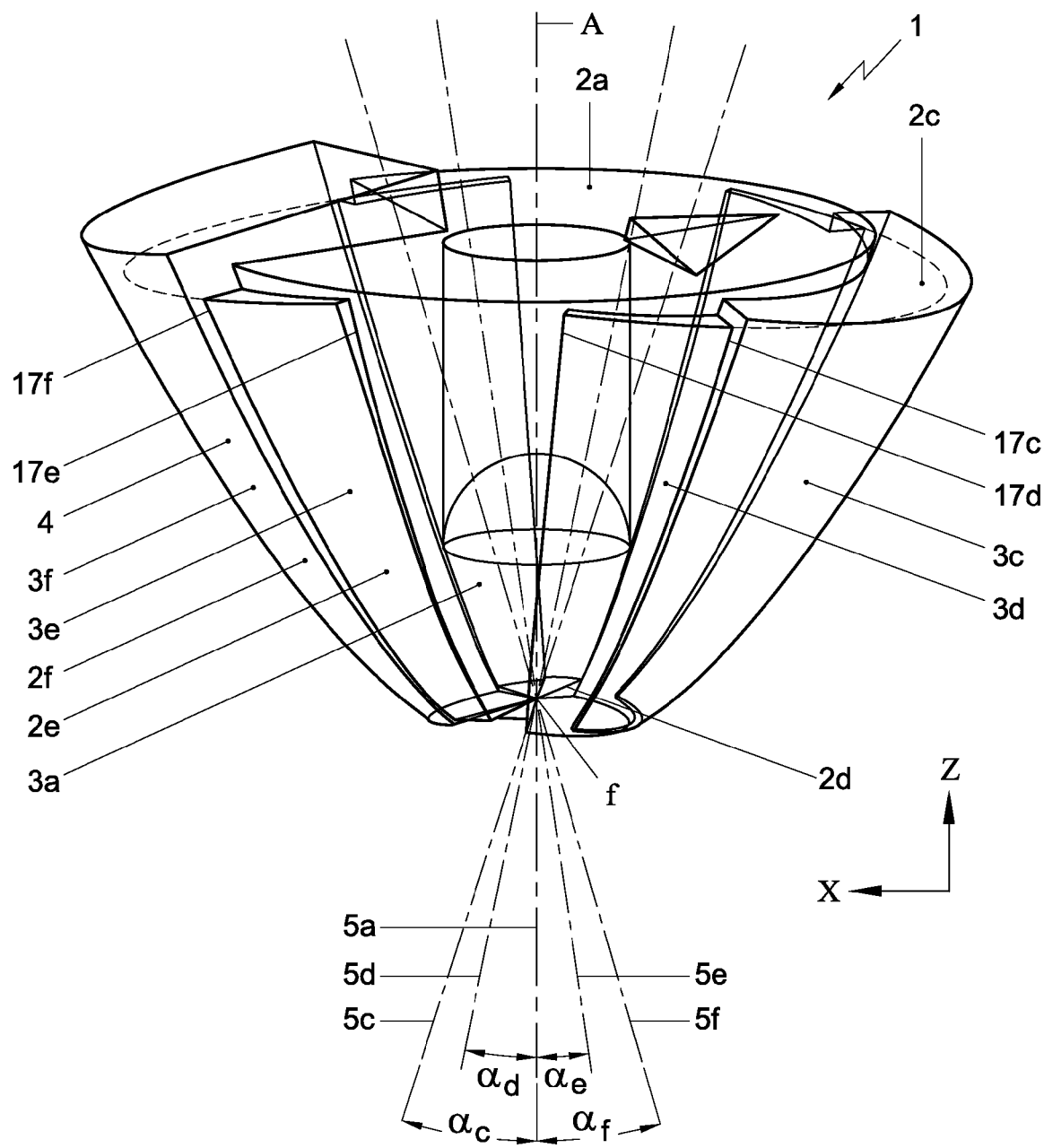
FIG. 6 shows a schematic perspective view of method for obtaining a beacon light optic according to the invention using a rotation symmetrical surface and segments of rotation symmetrical surfaces.

Part of the emitted rays of light is directed towards the reflective surface 4 by the lens surface 7a. These rays of light are reflected by the reflective surface 4 and will exit the optic 1 through the exit surface 10. Rays of light that do not reach the reflective surface 4 are directed towards the second lens surface 11, and are then further focused to exit the optic 1 through the exit surface 10. In this embodiment, the rays of light going through the second lens surface 11 are not reflected by the reflective surface 4 and vice versa. However, depending on the desired light beam, this may be different. Also, additional lens surfaces or reflective surfaces may be provided to obtain a desired light beam. The light rays exit the optic 1 in the direction of the optical axis A, here in the y-direction. The optic 1 in FIG. 5 is composed of five 16 rotation symmetrical surfaces, having outer surface parts 3a, 3b, etc. In FIG. 5 not all outer surface parts are identified. Since the beacon light optic 1 is composed of multiple, at least two, partly overlapping rotation symmetrical surfaces, or segments thereof as shown in FIG. 6, there are intersection 17a, 17b, 17c, etc. between the overlapping rotation symmetrical surfaces. The intersections 17a, 17b, 17c etc. are in this embodiment relatively sharp transitions between the overlapping surface parts. However, for reasons of simplicity or manufacturing, the intersections may also be smoothened or rounded, which however may give a loss in efficiency of the optic 1.

Also to be seen in FIG. 5 are four mounting means 12. The mounting means 12 are here provided as lips 13 with a hole 14 through which a bolt or other fastening means can be inserted. By using the mounting means 12, the optic 1 can be mounted in a beacon light, for example in a configuration as shown in FIG. 6. When the optic 1 is a massive optic, the optic 1 may be manufactured as a single piece complete with the mounting lips 13.

According to an embodiment of the present disclosure, the optic 1 can also be obtained by using at least two segments of rotation symmetrical surfaces or by using at least a rotation symmetrical surface and at least a segment of a rotation symmetrical surface. FIG. 6 shows an embodiment of an optic 1 in which use is made of a rotation symmetrical surface 2a and segments 2c, 2d, 2e and 2f. The segments 2c, 2d, 2e and 2f are in this embodiment wedge like segments of a rotation symmetrical surface. The segment 2c is placed under an angle $\alpha_c$ with respect to the basis form 2a. The segment 2d is placed under an angle $\alpha_d$ with respect to the basis form 2a. The segment 2e is placed under an angle $\alpha_e$ with respect to the basis form 2a and the segment 2f is placed under an angle $\alpha_f$ with respect to the basis form 2a. The basis form 2a and the segments 2c, 2d, 2e and 2f partly overlap each other.

The segments have the same focal point f, which here is the point around which the segments are angled with respect to the basis form 2a.

The reflective surface 4 is composed of the surface parts 3a, 3c, 3d, 3e and 3f of the rotation symmetrical surface 2a and the wedge like segments of a rotation symmetrical surface 2c, 2d, 2e and 2f. The thus created optic 1 can have a light beam with a relatively small divergence in one direction, here the vertical direction z and a relatively wide beam in another direction, here the horizontal direction x.

At the intersection between one segment and a subsequent segment, relatively sharp transition may occur, represented by the intersecting lines 17c, 17d, 17e and 17f. The intersecting lines 17 are preferably as sharp as possible within manufacturing and material possibilities. However, edges may be rounded somewhat to make the transition somewhat smoother, thereby, inevidently, reducing the efficiency of optic 1.

An optic 1 according to an embodiment may have a reflective surface 4 which is faceted in the surface parts 3a, 3b, etc. By varying the angles α, the surface area of the surface parts 3a, 3b etc. may be varied so the amount of energy exiting from the light rays in a certain direction may be varied. Thus, an optic 1 with an optimal distribution of light rays may be created.

Figure 7:
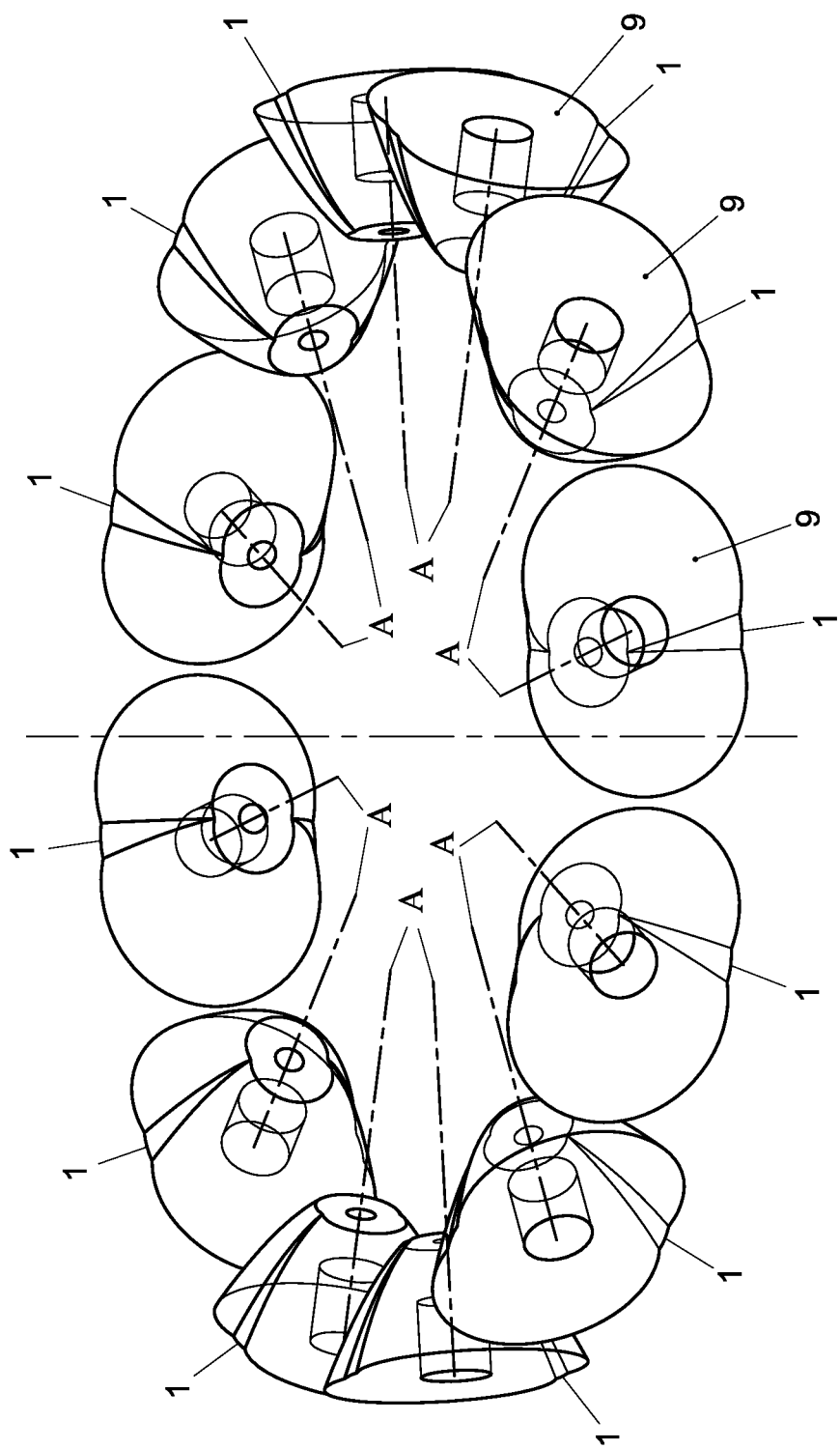
FIG. 7 shows a schematic perspective view of an arrangement of beacon light optics to form a beacon light according to the present disclosure.

In FIG. 7 a plurality of beacon light optics 1 are arranged in juxtaposition such that the optical axes A of each optic 1 are angled with respect to each other and the exit areas 9 of the optics 1 face outwardly. In the configuration shown in FIG. 7 the optics 1 are arranged approximately in a circle to provide for a 360 degrees light output. The optics 1 can be thus arranged to form a beacon light.

Figure 8:
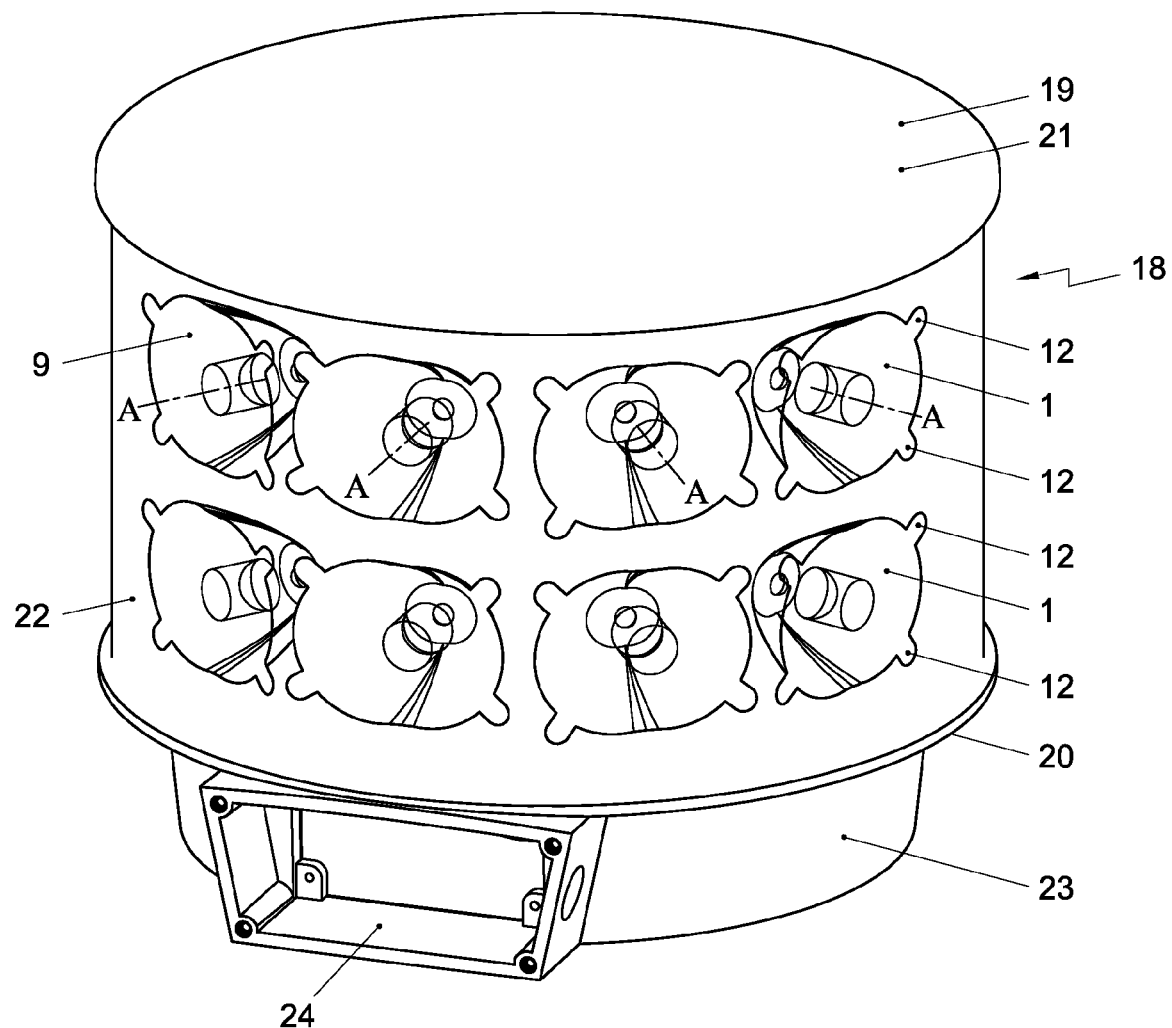
FIG. 8 shows a schematic perspective view of a beacon light with beacon light optics according to the present disclosure.

FIG. 8 shows schematically a beacon light 18 comprising a plurality of beacon light optics 1. The beacon light 18 may include a housing 19, having a base 23.

The beacon light optics 1 are arranged in juxtaposition such that the optical axes A of the beacon light optics 1 are angled relative to each other and the exit areas 9 of the beacon light optics 1 face outwards. In this beacon light 18 there are two rows of beacon light optics 1 which have a circular configuration as shown in FIG. 6. The azimuthal positioning of the rows is in line with respect to each other, but the azimuthal positioning of the rows can also be staggered to obtain an optimal 360 degrees directional light beam. In a staggered configuration, the light distribution of e.g. a top optic may overlap with the light distribution of two bottom optics directly underneath as to create a uniform light distribution in horizontal direction over 360 degrees.

The beacon light optics 1 are each mounted in a mounting frame (not shown) with their mounting means 12. The mounting frames are connected to each other and are placed inside a housing 19 of the beacon light 18. Alternatively a complete mounting frame provided with connections for the individual beacon light optics 1 can be provided and can be positioned in the housing 19 of the beacon light 18. Each beacon light optic 1 is provided with a printed circuit board to control the light emitting element. The printed circuit board may be connected to the mounting frame and may be provided with positioning means to position the beacon light optic into the printed circuit board.

The housing 19 has a lower surface 20 and an upper surface 21. The beacon light 18 further comprises a transparent shield 22 to cover and/or protect the beacon light optics 1.

The beacon light 18 may be attached to, or mounted on top of, a structure to be marked by means of the base 23.

The housing 19 may accommodate a power supply and/or transformer and/or control logic (not shown), which on the one hand may be electrically connected to the beacon light optics 1, and on the other hand to an external electrical connector 24 via which power may be supplied to the beacon light 18.

By varying the angles α a wider or smaller optic 1 can be obtained depending on the intensity of the used light emitting element. Present powerful LEDs may have sufficient intensity to provide for a relatively wide optic 1 having a relatively small vertical distribution and a relatively wide horizontal distribution of the emitted light beam. Also, by providing an optic 1, a light beam with a wider horizontal spread can be obtained than a conventional paraboloid optic or a conventional ovalized optic having the same light emitting element. The wider the optic 1 can become, the less optics 1 are needed to provide for an omni-directional emitting beacon light. When less optics 1 are sufficient, less LEDs can be used, resulting in fewer power consumption and reduced back-up battery capacity.

In this text relative terms such as for example 'horizontal', 'vertical', 'left', 'right', 'top', 'bottom', 'back' and 'front' as well as adjectival and adverbial derivates thereof, e.g. 'horizontally', 'upwardly', etc. should be construed to refer to the particular orientation as then described or shown in the drawing or figure under discussion. Relative terms are employed to clarify the exposition and may reflect a typical orientation, e.g. an orientation typical for the intended use or execution of the present invention. However, unless expressly stated otherwise, relative terms are not intended to limit the scope of the invention to any particular orientation.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

Many variants will be apparent to the skilled person in the art. The invention is not limited to the above shown examples. In particular, the optic according to the invention is explained as a beacon light optic, but can be used in various applications in which a small vertical and wide horizontal light beam may be desired, such as applications for marking and/or lighting buildings internally or externally. All variants are understood to be comprised within the scope of the invention defined in the following claims.

What is claimed is:

1. A beacon light optic, comprising:
    a reflective surface having an optical axis wherein the reflective surface is composed of surface parts of at least two at least partly overlapping segments of rotation symmetrical surfaces;
    an entrance area comprising an entrance surface for allowing light to enter the beacon light optic;
    an exit area through which light exits the beacon light optic;
    a light emitting element disposed in front of the entrance surface such that light emitting from the light emitting element enters the beacon light optic through the entrance area, wherein the optical axes of at least two rotation symmetrical surfaces are under an angle with respect to each other in a plane comprising the optical axes of each rotation symmetrical surface such that the surface parts of the thus created composed surface form the reflective surface of the optic.

2. The beacon light optic according to claim 1, wherein the at least two segments are at least wedge like segments.

3. The beacon light optic according to claim 1, wherein the focal points of the rotation symmetrical surfaces coincide.

4. The beacon light optic according to claim 1, wherein the rotation symmetrical surface is a paraboloid surface.

5. The beacon light optic according to claim 1, wherein the optic is a massive optic.

6. The beacon light optic according to claim 5, wherein the reflective surface is a total internal reflective surface.

7. The beacon light optic according to claim 5, wherein the exit area is an exit surface to allow light from the light emitting element to leave the optic.

8. The beacon light optic according to claim 1, wherein the entrance surface is a first lens surface.

9. The beacon light optic according to claim 1, further comprising a second lens surface positioned at the optical axis for transmitting light which is not reflected by the reflective surface.

10. The beacon light optic according to claim 7, wherein the exit surface is a third lens surface.

11. A beacon light for marking obstructions for marine and/or aviation navigation, comprising: a plurality of beacon light optics according to claim 1, wherein the plurality of beacon light optics are arranged in juxtaposition such that the optical axes of the beacon light optics are angled relative to each other and the exit areas of the beacon light optics face outwards.

12. The beacon light of claim 11, further comprising a further plurality of beacon light optics, wherein the further plurality of beacon light optics are arranged in juxtaposition such that the optical axes of the beacon light optics are under an angle relative to each other and the exit areas of the beacon light optics face outwards; and
    wherein the further plurality of beacon light optics are stacked on top of the plurality of beacon light optics.

13. Method for obtaining a beacon light optic according to claim 1, comprising
    providing at least segments of at least two rotation symmetrical surfaces,
    positioning the at least segments of the rotation symmetrical surfaces at least partly overlapping with respect to each other,
    composing the outer reflective surface of the beacon light optic by outer surface parts of the at least partly overlapping at least segments of the rotation symmetrical surfaces, and providing a light emitting element in front of an entrance surface of the beacon light optic.

* * * * *